June 12, 1951     H. HARRISON     2,556,390
CHIP DETECTOR
Filed Oct. 1, 1949
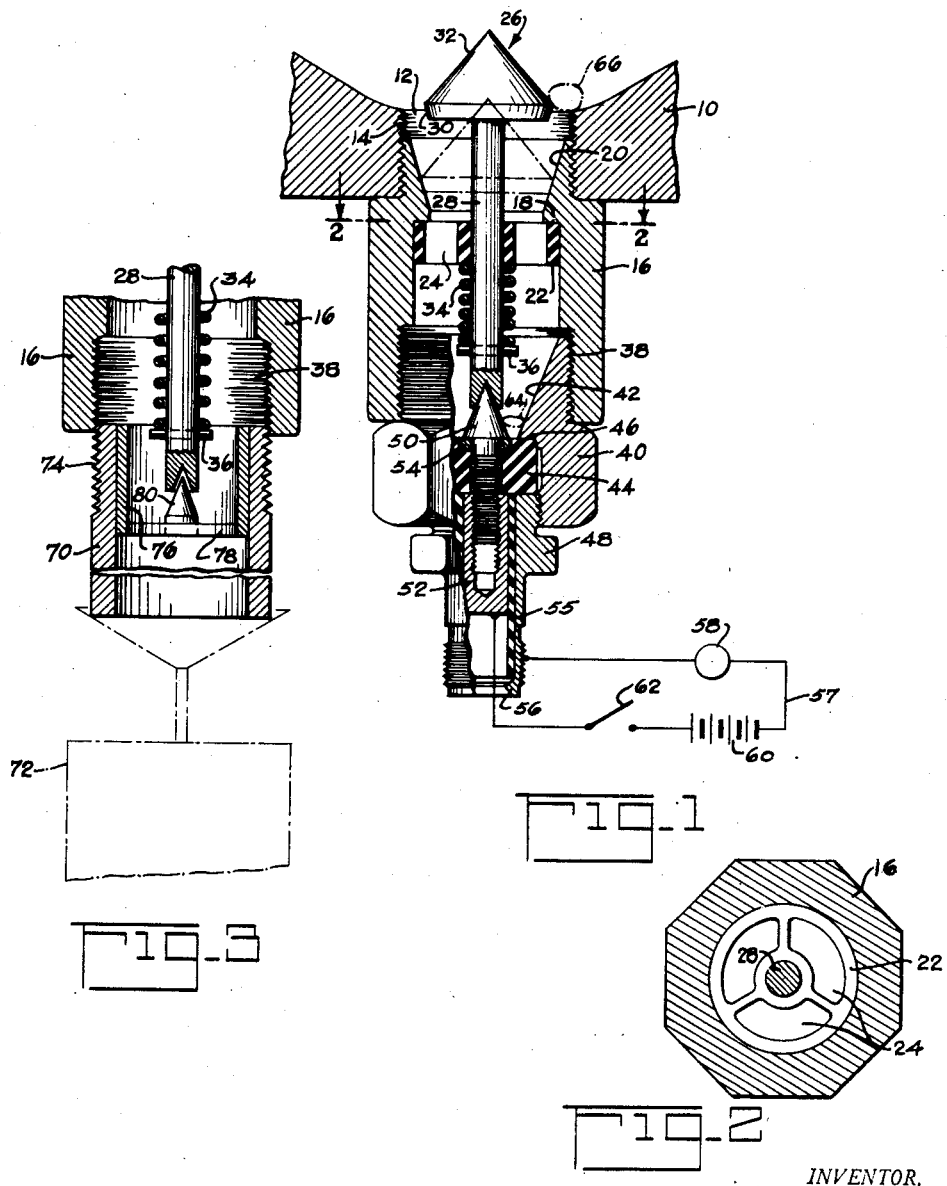
INVENTOR.
HARRY HARRISON.
BY Victor A. Behn
ATTORNEY Patented June 12, 1951

2,556,390

UNITED STATES PATENT OFFICE 2,556,390

CHIP DETECTOR

Harry Harrison, Fair Lawn, N. J., assignor to Wright Aeronautical Corporation, a corporation of New York Application October 1, 1949, Serial No. 119,176

5 Claims. (Cl. 200—53)

This invention relates to apparatus for detecting the presence, within an engine, of chips or pieces broken off parts of the engine thereby providing a warning that some part of the engine may be about to fail. Such apparatus is known as a chip detector.

Aircraft engines are commonly equipped with a chip detector in order to provide a warning of possible incipient engine failure. Such detectors generally comprise a plug located at the lower-most portion of the engine housing or sump or at some other location where chips from engine parts will settle. This plug is provided with a central electric contact spaced and insulated from the engine housing. An electric circuit including a warning signal is connected or is adapted to be connected between said central contact and the adjacent portion of the engine housing so that when said circuit is so connected the warning signal is energized if a metal piece or pieces should bridge the gap between said central contact and the adjacent portion of the engine housing. The electric warning signal circuit can either form part of the aircraft installation or said circuit may be portable and adapted to be connected to the chip detector plug when the aircraft engine is being checked after or prior to a flight.

During engine operation small or fine metal particles normally wear off from relatively moving engaging engine parts, but the gap between said central electrode of the chip detecting plug and the adjacent housing portion is sufficiently large that these fine particles are too small to bridge said gap to complete the electric circuit connected thereacross. When a large piece or chip breaks off a part of the engine it will bridge said gap and when said circuit is connected across said gap the warning signal will be operated. It frequently is the case, however, that said signal is operated not because a large piece or chip has broken off an engine part but because the fine particles, resulting from normal engine wear, having accumulated at the chip detecting plug to such an extent as to bridge said gap whereupon said warning signal circuit will be energized to give a false indication of the presence of a chip. In either case if the warning signal operates, the chip detecting plug is removed while the aircraft engine is on the ground in order to determine the cause of the signal. When the plug is removed all the oil in the engine housing is lost. This is particularly wasteful if the warning signal energization is caused only by the accumulation of fine particles at the chip detecting plug, said fine particles merely being the result of normal engine wear.

In accordance with the present invention the chip detecting structure comprises two parts, a first tubular part adapted to be removably secured to the engine over a hole in the engine housing at which chips are apt to collect and a second part or plug for closing the outer end of said tubular part. In addition a valve is provided for closing the inner end of the tubular part when said plug is removed, said valve being mechanically moved to its open position by an electric contact on said plug when said plug is being secured in position on the tubular member and said valve and plug contact both functioning as chip detecting electrodes. With this arrangement when the chip detecting plug is removed in order to determine the cause of an operation of the chip detecting warning signal the valve closes to prevent loss of engine oil.

Other objects of the invention will become apparent upon reading the annexed detailed description in connection with the drawing in which:

Figure 1 is a sectional view through a chip detecting plug structure embodying the invention, Figure 2 is a sectional view taken along line 2—2 of Figure 1; and Figure 3 is a sectional view illustrating oil draining apparatus for use with the chip detecting structure of Figures 1 and 2.

Referring first to Figures 1 and 2 of the drawing, an engine housing or sump for the engine lubricating oil is indicated in part at 10, said housing being of metallic material and having an opening 12 at its lower-most portion or at some other point at which chips breaking off engine parts are apt to collect. The opening 12 is threaded as indicated at 14. A hollow metallic tubular member 16 is screwed into the tapped hole 12, said tubular member having an internal shoulder 18 intermediate its ends and facing the outer end of said member. In addition the bore of said tubular member between its shoulder 18 and its inner end comprises a conical surface 20 flaring or increasing in diameter toward said inner end. A valve guide 22 of electric insulating material is fitted within the tubular member 16 against the shoulder 18, said valve guide having openings 24 therethrough to provide substantially unrestricted communication between the ends of said tubular member. A valve member 26 is provided with a stem 28 slidably received in the valve guide 22. The head of the valve 26 has a conical valve seat portion 30 tapering toward the valve stem 28 and adapted to seat against the conical surface 20 to close the opening 12. In addition the tip or inner end of the valve head comprises a conical portion 32 with its apex directed inwardly into the engine housing 10. A valve spring 34 is disposed between the valve guide 22 and a pin 36 extending through and carried by the valve stem 28, said spring urging the valve 26 toward its closed position.

The outer end of the tubular member 16 is provided with internal threads 38, similar to the threads 14 of the opening 12 in the engine housing, and a plug 40 is screwed into the outer end of the tubular member 16 to close the outer end of said member. The body of the plug 40 is metallic and hollow with a conical recess 42 at its inner end flaring or increasing in diameter toward the interior of the engine housing. A collar 44 of electric insulating material is held against a shoulder 46 in the plug 40 by a nut 48 and an electrode 50 extends centrally through the insulating collar 44. The electrode 50 has a conical head portion at its inner end and its outer end extends through the insulating collar 44 and is screwed into an electric contact member 52. A gasket 54 is disposed between the head of the electrode 50 and the insulating collar 44 to prevent leakage of engine lubricating oil out between said electrode and collar. A sleeve 55 of electric insulating material is disposed between the electric contact member 52 and the nut 48, said sleeve being held in position by an inturned flange 56 formed at the outer end of the nut 48.

The conical head of the electrode 50 has its apex or tip end directed inwardly into the engine housing and said tip end is received within a recess in the adjacent end of the valve stem 28. As illustrated, when the plug 40 is screwed into position on the tubular member 16, the tip of the electrode 50 is received within the recess in the valve stem 28 to move and hold the valve 26 open against the spring 34. At the same time, engagement of the electrode 50 with the valve stem 26 provides an electric connection therebetween. When the plug 40 is removed from the tubular member 16, the spring 34 automatically closes the valve 26 to prevent loss of lubricating oil from the engine out through the opening 12. As illustrated in Figure 1, the dimensions are such that the valve 26 closes before the plug 40 is completely unscrewed from the tubular member 16.

An electric circuit 57 is connected or is adapted to be connected to the plug 40. As schematically illustrated in Figure 1, the circuit 57 connected to the plug 40 comprises a signal 58, a source of electric energy 60 and a switch 62 with one side of said circuit connected to the electric contact member 52 and with the other side of said circuit connected to the nut 48 of the plug 40. The signal 58 may comprise an electric lamp, a buzzer, or any other electrically operable indicator. The electric circuit 57 may form part of the engine installation with the signal 58 disposed in the pilot's cockpit or a mechanic in checking the engine may connect the circuit 57 to the plug 40.

With the afore-described construction of Figures 1 and 2, when the switch 62 is closed the signal 58 will be energized by any metal piece or pieces bridging the fluid gap between the electrode 50 and the adjacent surface portion 42 of the plug 40. Such a piece is schematically indicated by dot-and-dash lines at 64. In addition, because of the electric connection between the electrode 50 and the valve stem 28, the signal 58 may be energized by any metal piece bridging the fluid gap between the head of the valve 26 and the adjacent portion of the engine housing 10 and/or the adjacent portion of the tubular member 16. Such a large piece is indicated by the dot-and-dash lines at 66. All but very large pieces will settle down past the valve 26 to the space between the electrode 50 and the adjacent conical surface 42 of the plug 40.

In order to determine the cause for the energization of the signal 58 the plug 40 is removed but the tubular member 16 is left secured into the engine housing opening 12. As will generally be the case, if the signal 58 was energized because of a metal piece or pieces bridging the gap between the electrode 50 and the adjacent surface portion 42 of the plug 40 the nature of said piece or pieces can be determined upon removal of the plug 40. When the plug 40 is removed there is no loss of oil through the engine housing opening 12 because the valve 26 automatically closes upon removal of a plug 40. If, however, the signal was energized because a large piece 66 is lodged at the valve 26, then when the plug 40 is screwed back into the tubular member 16 the signal 58 will be reenergized thereby indicating this fact. The tubular member 16 and its valve 26 may then be removed from the engine housing hole 12 in order to determine the nature of the piece 66 causing the signal. In so doing any engine lubricating oil will drain out through the engine housing opening 12. In the vast majority of cases, however, the signal 58 will be energized because the circuit 57 is closed by a metallic piece or pieces at the electrode 50. In general, therefore, with the chip detecting structure of Figures 1 and 2 no engine lubricating oil is lost in determining the cause of energization of the chip warning signal 58.

If the engine housing 10 is full of oil when the tubular member 16 is being unscrewed from the housing opening 12, then the moment the tubular member 16 is removed from said opening 12 oil will gush through said opening. As a result the oil may splatter quite a bit and any chips such as 66 may be lost. A more satisfactory procedure is to use the pipe and container illustrated in Figure 3 for emptying the engine housing 10 of oil before the tubular member 16 is removed from said housing.

As illustrated in Figure 3 a pipe 70 is connected at one end to a container schematically indicated at 72. The other end of the pipe 70 is provided with threads 74 adapted to mate with the tubular member threads 38. In addition a sleeve 76 having a cross-bar 78 is welded or otherwise secured within the threaded end of the pipe 70 and a conical prong 80 is secured to and extends co-axially from the cross-bar 78.

With this construction of Figure 3, before the tubular member 16 is removed from the engine housing 10, the pipe 70 is threaded into said tubular member in place of the plug 40. As a result the prong 80 engages the adjacent end of the valve stem 28 to open the valve 26 whereupon the oil within the engine housing 10 drains into the container 72. The tubular member 16 can then be removed from the housing 10 without the aforementioned danger of losing a chip 66 because of oil gushing through the housing opening 12. Obviously the tip of the prong 80 should be so disposed relative to the threaded end of the pipe 70 that the pipe threads 74 will engage with the tubular member threads 38 before the prong 80 opens the valve 26.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications.

I claim as my invention:

1. A chip detector adapted to be removably secured to the housing of an engine so as to close an opening into said housing at a point at which chips from engine parts are apt to collect; said detector comprising a tubular member adapted to be removably secured to said engine housing over said opening; a valve carried by said tubular member and adapted to close to prevent flow therethrough, said valve when open being insulated from said tubular member and having a portion spaced from said tubular member and housing by a fluid gap; and a plug including a body member and an electrode carried by and electrically insulated from said body member, said plug being adapted to be removably secured to said tubular member with said electrode spaced from a wall of at least one of said members by a fluid gap and with said electrode engaging said valve to hold said valve open and to connect said circuit to said valve whereby said circuit can be completed by a metallic chip bridging either of said fluid gaps.

2. A chip detector as recited in claim 1 and including a spring for urging said valve to its closed position.

3. A chip detector adapted to be removably secured to the housing of an engine so as to close an opening into said housing at a point at which chips from engine parts are apt to collect; said detector comprising a tubular member adapted to be removably secured to said engine housing over said opening; a valve co-axially carried by said tubular member; means providing a guide for said valve such that when open said valve is electrically insulated from said tubular member and has a portion spaced from said housing and tubular member by a fluid gap; a spring for urging said valve toward its closed position; and a plug including a body member and an electrode co-axially carried by and electrically insulated from said body member, said plug being adapted to have an electric circuit connected to said electrode and being adapted to be removably secured to said tubular member with said electrode spaced from a wall of at least one of said members by a fluid gap and with said electrode engaging said valve to hold said valve open against said spring and to connect said circuit to said valve whereby said circuit can be completed by a metallic chip bridging either of said fluid gaps.

4. A chip detector adapted to be removably secured to the housing of an engine so as to close an opening into said housing at a point in which chips from engine parts are apt to collect; said detector comprising a tubular member adapted to be removably secured to said engine housing over said opening; a valve co-axially carried by said tubular member, said valve having a conical head portion with its apex directed into said housing and having a stem portion extending in the opposite direction; means providing a guide for said valve such that when said valve is open said valve head is electrically insulated from and is spaced from said housing and tubular member by a fluid gap; a spring for urging said valve toward its closed position; and a plug including a body member and an electrode co-axially carried by and insulated from said body member, said plug being adapted to have an electric circuit connected to said electrode and being adapted to be removably secured to said tubular member with said electrode spaced from a wall of at least one of said members by a fluid gap and with said electrode engaging said valve to hold the valve head open against said spring and to connect said circuit to said valve head whereby said circuit can be completed by a metallic chip bridging either of said fluid gaps.

5. A chip detector adapted to be removably secured to the housing of an engine so as to close an opening into said housing at a point at which chips are apt to collect; said detector comprising a tubular member adapted to be removably secured to said engine housing over said opening; a valve carried by said tubular member and adapted to close the inner end of said member; means providing a guide for said valve such that when open said valve is electrically insulated from said tubular member and has a portion spaced from said housing and tubular member by a fluid gap; a spring for urging said valve toward its closed position; and a plug including a body member and an electrode co-axially carried by and electrically insulated from said body member, said plug being adapted to have an electric circuit connected to said electrode and being adapted to be removably secured to the outer end of said tubular member with said electrode having a portion spaced from a wall of at least one of said members by a fluid gap and with said electrode engaging said valve to hold said valve open against said spring and to connect said circuit to said valve whereby said circuit can be completed by a metallic chip bridging either of said fluid gaps.

HARRY HARRISON.

REFERENCES CITED

The following references are of record in the file of this patent:

UNITED STATES PATENTS

| Number | Name | Date |
|---|---|---|
| 1,446,056 | Misener | Feb. 20, 1923 |
| 2,252,222 | Van Os | Aug. 12, 1941 |